United States Patent [19]
Jamzadeh et al.

[11] Patent Number: 5,151,717
[45] Date of Patent: * Sep. 29, 1992

[54] IMAGING METHOD AND APPARATUS USING DISCRETE RECEIVING SHEETS

[75] Inventors: Fereidoon S. Jamzadeh, Fairport; Arun Chowdry, Pittsford; Kevin M. Johnson, Rochester, all of N.Y.

[73] Assignee: Eastman Kodak Company, Rochester, N.Y.

[*] Notice: The portion of the term of this patent subsequent to Feb. 19, 2008 has been disclaimed.

[21] Appl. No.: 651,844

[22] Filed: Feb. 4, 1991

Related U.S. Application Data

[63] Continuation-in-part of Ser. No. 533,237, Jun. 4, 1990, Pat. No. 4,994,827.

[51] Int. Cl.⁵ .................... G03G 15/01; G03G 21/00; B41B 17/00
[52] U.S. Cl. .................................... 346/157; 354/7; 355/310; 355/326
[58] Field of Search .................. 346/157; 354/7; 355/310, 326

[56] References Cited

U.S. PATENT DOCUMENTS

| | | |
|---|---|---|
| 4,408,301 | 10/1983 | Iida . |
| 4,706,099 | 11/1987 | Suzuki ........................ 346/160 |
| 4,712,906 | 12/1987 | Bothner et al. ............ 355/3 TR |
| 4,796,054 | 1/1989 | Maeno et al. . |
| 4,872,037 | 10/1989 | Kasahara et al. . |
| 4,968,578 | 11/1990 | Light et al. . |

Primary Examiner—George H. Miller, Jr.
Attorney, Agent, or Firm—Leonard W. Treash

[57] ABSTRACT

A variety of sizes of prints are made electrophotographically utilizing a single large size receiving sheet, for example, a receiving sheet that is 12×18 inches. The receiving sheet is large enough to receive one image of the largest size or an array of smaller sized images. The receiving sheet with smaller images is cut to size after transfer. The method is particularly useful in forming multicolor images on a receiving sheet wrapped around a transfer drum.

4 Claims, 13 Drawing Sheets

IMAGING METHOD AND APPARATUS USING DISCRETE RECEIVING SHEETS

RELATED APPLICATIONS

This application is a continuation-in-part of U.S. patent application Ser. No. 07/533,237, filed Jun. 4, 1990, MULTICOLOR IMAGING METHOD AND APPARATUS, Jamzadeh et al, now U.S. Pat. No. 4,994,827, issued Feb. 19, 1991.

TECHNICAL FIELD

This invention relates to electrophotography, and more particularly to a method and apparatus for simplifying receiving sheet handling, for example, while providing a variety of size of reproduction. Although not limited thereto, the invention has particular utility in adapting electrophotographic multicolor processes to the field of photofinishing.

BACKGROUND ART

In conventional color electrophotography a series of electrostatic images are created on an image member. The images are toned with different colored toners and then transferred in registration to a receiving surface to create a multicolor toner image. Typically, the receiving surface is a receiving sheet of paper or similar material which has been secured around the periphery of a transfer drum. The transfer drum is rotated in contact or near contact with the image member to repeatedly bring the receiving sheet into transfer relation with the consecutive images to overlay them in registration. See, for example, U.S. Pat. No. 4,712,906, Bothner et al, which also shows in FIG. 8 a multicolor method in which the single color toner images are superposed on the surface of an intermediate transfer drum and transferred to a receiving sheet as a multicolor image in a single step.

The photofinishing business worldwide thrives on a few commonly desired sizes of prints. In the United States, for example, nearly all prints are either (in inches) 4×6, 5×7, 8×10, or 11×17. Nearly all photofinishing operations produce many more of the smallest size (4×6) than of all of the larger sizes put together. However, some flexibility is necessary in all machines that are not dedicatd 100% to snapshots.

In silver halide photofinishing, this flexibility is supplied by supplying photographic paper in roll form, exposing and processing whatever pictures and whatever sizes are programmed into the printer and then cutting the prints to size later. It is known to cut the photographic paper both across the direction of movement and with the direction of movement so that some prints can be exposed side-by-side. Although a machine 100% dedicated to snapshots, for example, 4×6, may use either 4-inch wide or 6-inch wide rolls, it is more common to mix sizes on the same larger roll and custom cut. For example, 8-inch wide paper can be used for two rows of 4×6 images or one row of 8×10 images with both sets of images being positioned with their long dimension running with the direction of movement of the paper. All the 4×6's can be batched and the cutter set to cut 4×6's and then all of the 8×10's batched and the cutter repositioned for cutting 8×10's. The slitting and cutting art is sophisticated. Virtually any arrangement can be done automatically.

In electrophotography, commercial color systems have a strong technical preference for cut sheets. That is, a single cut receiving sheet is positioned around a transfer roller by attaching both its leading edge and its trailing edge to the roller. The roller is rotated through a nip with a toner image carrying image member once for each color image to be transferred. A roll supply does not readily fit this technology.

If cut sheets are attached by both the leading and trailing end to a transfer roller and the apparatus is flexible enough to take sheets of different length, larger sheets will necessarily overlap the trailing end securing means of the shorter sheets. This presents a problem to transfer in these areas that has not been 100% solved for highest quality imaging. That is, vacuum holes under a sheet in a transfer nip in which transfer is done either by electrostatics or by heat affects the transfer enough to be noticeable in the image itself. Gripping fingers create even more noticeable artifacts.

Electronic electrophotographic imaging, for example, imaging by exposing a photoconductive image member with a laser or LED printhead, has added new flexibility to electrophotography and other similar systems. For example, U.S. Pat. No. 4,706,099 shows an electrophotographic copier in which a photoconductor having a width in excess of 16 inches is scanned to produce a wide image fully across the photoconductor. When narrower images are desired, image information in memory is rasterized in a manner that causes the images to be scanned in pairs side-by-side across the width of the photoconductor. The images are transferred side-by-side to separate sheets stored on a roll and cut prior to transfer. Because it is a single color machine, the problem of a transfer roller holding sheets of different size is not faced.

This patent illustrates the capability present in the art to store image information in memory, retrieve it and place it at any desired location and orientation (portrait or landscape) desired on an image member such as a photoconductor. See also, for example, U.S. Pat. No. 4,408,301. In fact, electronic copiers and printers are available which allow the operator to pick the position, orientation and magnification of any stored image and place more than one image on the same final print.

DISCLOSURE OF THE INVENTION

It is an object of the invention, to provide a method and apparatus for forming images on a receiving sheet, but which method and apparatus involves simplified receiving sheet handling.

This and other objects are accomplished by utilizing a single discrete large size transfer sheet for all images regardless of image size and using an electronic exposure means and suitable electronics to position a plurality of images on that sheet. The receiving sheet is then cut according to the size of the images thereon after transfer.

The use of a single sheet of a convenient size greatly simplifies the apparatus handling the sheet throughout the system including the paper supply, the fuser and the transports between stations. However, the invention has its most spectacular application to color systems. For example, with this structure a transfer drum around which the receiving sheet is wrapped need be designed to take only a single size sheet but the apparatus can produce a variety of sizes of print. The invention thus provides the flexibility of a continuous roll supply in a machine that has a strong technical preference for cut sheets.

According to a preferred embodiment, the single large sheets are exactly integer multiples of the most common size print to be made (for example, snapshot size prints) thereby providing no waste in a cutting operation to be performed after transfer. For example, a sheet 12 inches by 18 inches will take nine 4×6 images exactly and without waste. The same size receiving sheet will accommodate 5×7's, 8×10's and 11×17's with some waste or border.

BRIEF DESCRIPTION OF THE DRAWINGS

In the detailed description of the preferred embodiment of the invention presented below, reference is made to the accompanying drawings, in which.

BEST MODE OF CARRYING OUT THE INVENTION

Figure 1:
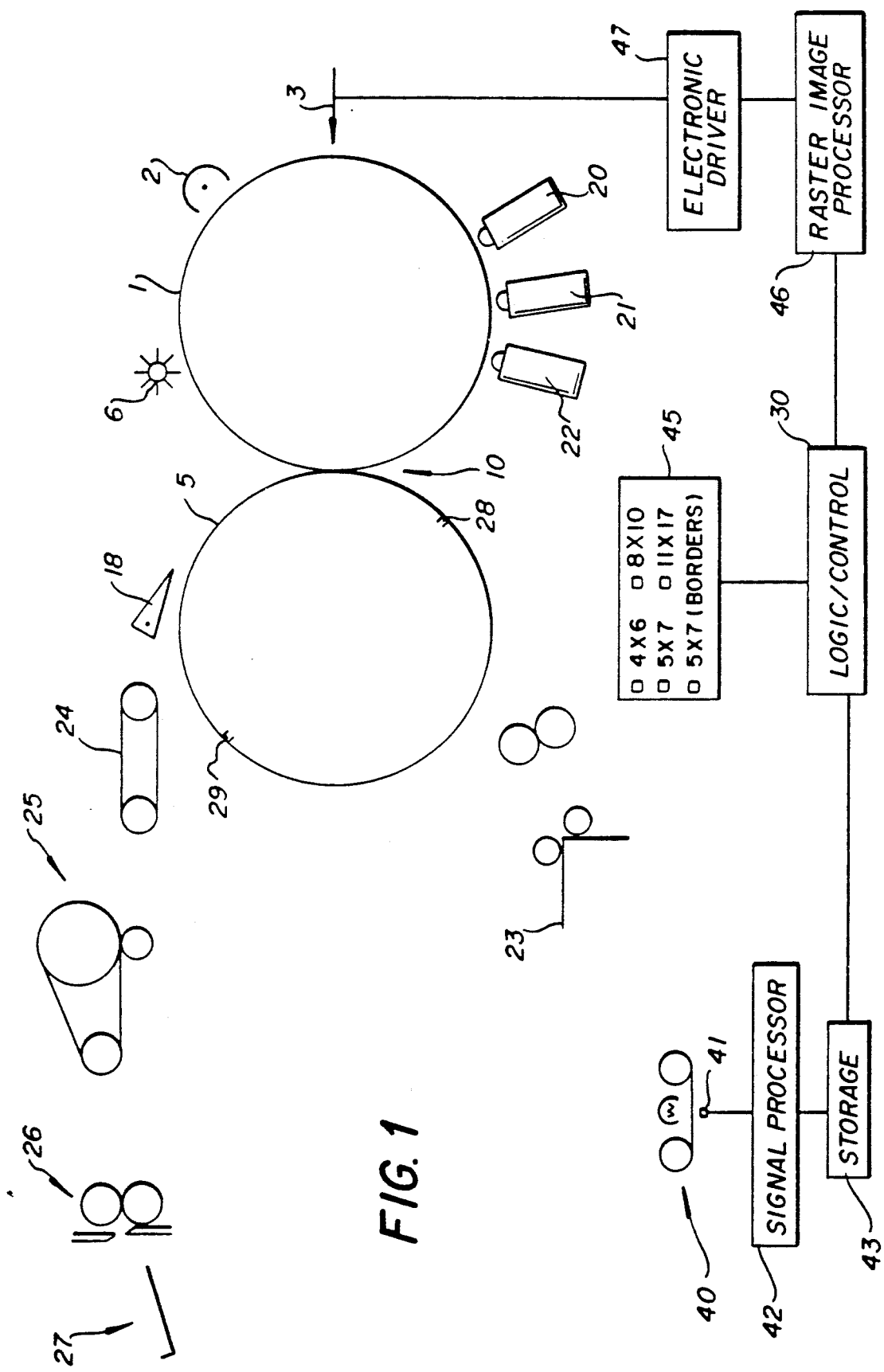
FIG. 1 is a side schematic of a multicolor image forming apparatus.
Figure 2:
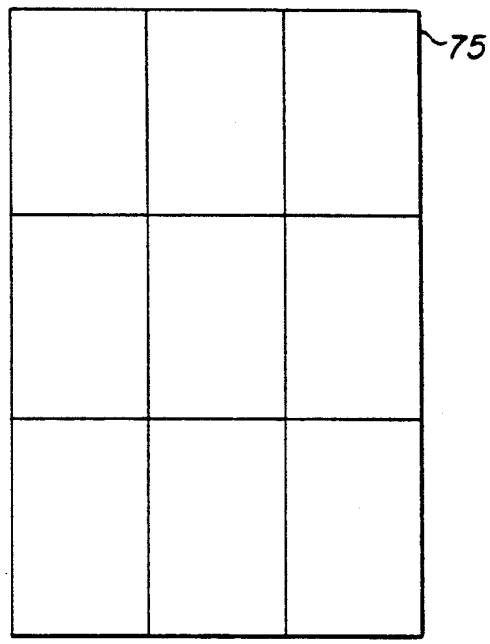
FIGS. 2, 3, 4 and 5 are top views illustrating receiving sheets having various size image areas prior to cutting.

FIG. 1 illustrates a multicolor image forming apparatus utilizing electrophotography. Most of it is conventional. An image member, for example, a photoconductive drum 1, is rotated by a motor, not shown, past a series of electrophotographic stations, all well-known in the art. A charging station 2 uniformly charges the surface of the drum 1. The uniformly charged surface is exposed at an exposure station, for example, laser exposure station 3, to create a series of electrostatic images, each representing a color separation of a multicolor image to be formed. The series of electrostatic images are toned by different color toner stations 20, 21 and 22, one different color for each image, to create a series of different color toner images. The images are then transferred in registration to a receiving sheet carried on the periphery of a transfer roller or drum 5. The drum 1 is cleaned by cleaning station 6 and reused.

The receiving sheet is fed from a receiving sheet supply 23 into a nip 10 between drum 1 and drum 5. As it approaches nip 10 it is secured to drum 5 by a vacuum means, gripping fingers or other mechanism. For example, the leading end of the sheet can be secured by a row of vacuum holes 28 and the trailing end by a row of vacuum holes 29.

After all 3 (or 4) color separation toner images have been transferred to the surface of the receiving sheet, the leading edge of the receiving sheet is stripped from roller 5 by stripping mechanism 18. The receiving sheet is pushed by further rotation of roller 5 onto a sheet transport 24 which carries it to a fixing device 25 and then to a cutter 26. After the sheet has been cut by the cutter 26 the resulting prints are collected in a tray 27 or more sophisticated print collecting device.

The input for exposure station 3 begins with a color scanner 40 which includes a color responsive CCD 41 for scanning an original to be printed, for example, 35 mm color negative film. The output from CCD 41 is fed to a signal processor 42 which converts the CCD signal into a form suitable for storing in memory. For example, signal processor 42 can use suitable compression algorithms to save on storage, enhance the image in both its color aspects and its resolution including color masking, halftone screening, etc. all processes well known in the art. After such signal processing, the image information is stored in a suitable storage 43. Because this system demands substantial storage, a preferred form of storage is a system using magnetic disks.

A logic and control 30 is capable of accessing the storage 43 and also receives inputs from various portions of the machine including encoders (not shown) on drum 1 and roller 5 and various stations to manage the timing of the entire apparatus. One of the inputs to logic and control 30 is a print size designation portion 45 of an operator control panel. As shown in FIG. 1, the operator can press a button beside any of four print sizes ranging from 4×6 through 5×7, 8×10, 11×17 and also 5×7 with borders. The logic and control 30 then receives the input from the print size designation portion 45 and the memory 43 and supplies that information in an appropriate form to raster image processor 46 which lays out the bit map for the ultimate exposure. The output from the raster image processor 46 is fed to an electronic driver 47 for electronic exposure station 3 to control the intensity of a laser, LED printhead, or the like, making up that station.

Prior electrophotographic color apparatus capable of providing a variety of sizes of sheets has a sheet supply 23 which can be loaded with different sizes of sheets and a transfer drum 5 which is capable of holding different size sheets. These devices have specific complexities that are undesirable in such apparatus including flexibility in the sheet supply and other portions of the paper path. For example, adjustments for size must be made in the sheet supply or different size cartridges used. The distance between stations and between feed rollers must accommodate the different sizes. However, the most serious problems arise in securing the sheets to transfer roller 5. If both the leading and trailing edges of the sheet are to be held by a vacuum means 28 and 29 as shown in FIG. 1, those vacuum means must be separated by different lengths of the drum periphery for different size sheets. The drum being capable of taking a larger size, small prints will be produced at the same slow rate that larger prints are produced. More significantly, image quality in the large sheets will suffer from the vacuum holes that are necessarily under their image areas.

To solve this problem, the apparatus as shown in FIG. 1 is capable of taking a single large size sheet, for example, 12 inches by 18 inches. Only 2 sets of vacuum holes are provided and the entire apparatus is optimized for productivity for the single size sheet. The sizes are chosen to allow later cutting for the print size produced. Examples of preferred image locations for different sizes of image are shown in FIGS. 2-5. According to FIG. 2 a 12 inch by 18 inch receiving sheet 75 can hold nine 4×6 images exposed edge-to-edge with no waste. The other common sizes will produce some waste with a 12×18 inch receiving sheet. Although vacuum holes 28 and 29 will in fact be under the very leading and trailing edges of the receiving sheet 75, they can be limited to the leading and trailing one quarter inch where such defects are least likely to be noticed. Alternatively, a narrow leading and trailing margin can be provided and later trimmed.

Figure 3:
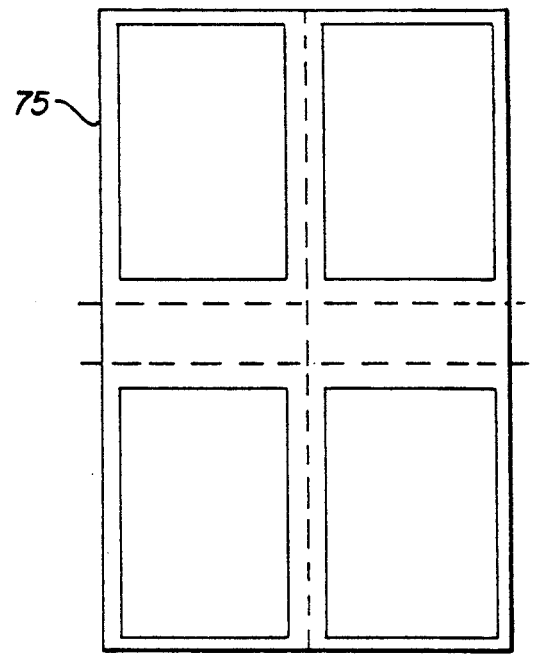
Figure 4:
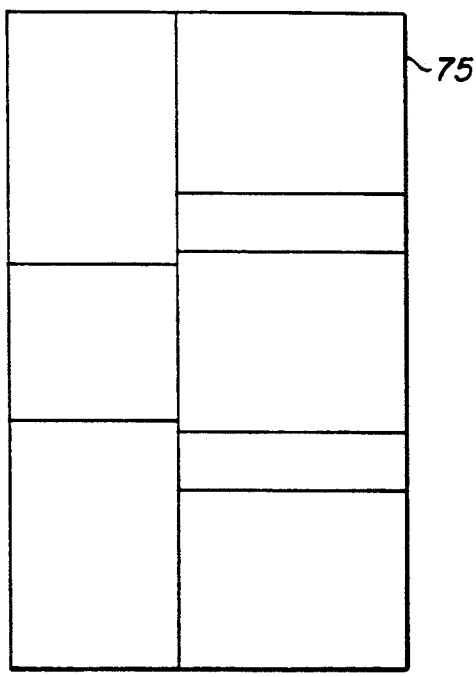

FIGS. 3 and 4 show two approaches to positioning 5×7 images on a 12×18 receiving sheet. Other such arrangements for 5×7's can be designed. The FIG. 4 arrangement is the most efficient, fitting five 5×7's on a 12×18 receiving sheet. The FIG. 3 arrangement fits only four 5×7's in the same space, but has several advantages. A primary one is that if the receiving sheet is cut along the dotted lines shown in FIG. 3, a ½ inch border is provided for each print. Further, the cutting itself is far simpler than that in FIG. 4. Although automatic equipment is available that will cut and slit the geometry shown in FIG. 4, equipment to cut that geometry shown in FIG. 3 is far simpler.

Figure 5:
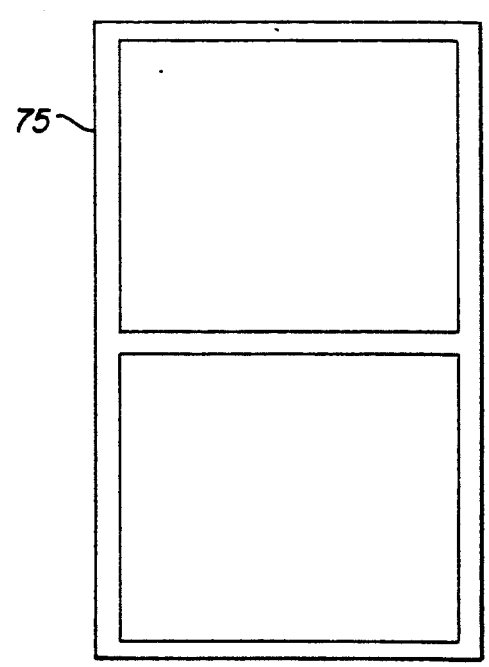

FIG. 5 illustrates two 8×10 images on a 12×18 receiving sheet. With this geometry, if the sheet is cut exactly in half the 8×10's will have ½ inch borders on the top and bottom and 1-inch borders on the sides. The 11×17 format is not illustrated. It, of course, would fit on a 12×18 with half-inch borders on top, bottom and both sides.

Although snapshots are popular without a border, larger prints often are mounted with a border. The 12×18 size allows production of four 5×7's, two 8×10's and one 11×17 with even borders. It is presently within the skill of the art to provide a selection of colors for borders produced on color copiers. This same technology can be used to permit choice of border color for each print larger than 4×6 in the apparatus shown in FIG. 1, by exposing the border area uniformly for one or more of the color separations.

The 12 inch×18 inch size is particularly useful in the United States with the standard print sizes discussed above. Most of these sizes have been standard in the United States for printing from 35 mm film for more than 40 years. However, other size receiving sheets may be optimum for other circumstances. For example, in markets in which 4×6 is not the high volume size, integer multiples of whatever that size is is a preferred starting point in determining the preferred receiving sheet size. Further, if customers prefer snapshots with borders, which are not presently popular, then the receiving sheet would either have to be made larger by the amount of the borders, or the image area reduced in size. Other arrangements could include a combination of different size prints from the same receiving sheet, for example, seven 4×6 prints and one 5×7. All of this is well within the skill of the art within the general framework of this description.

The slitting, chopping or cutting arts are extremely well developed. Devices are presently available that can be set to slit or cut any sheet at a variety of locations. However, a medium volume photofinishing operation may install a less expensive automatic cutting device that cuts only a single high volume print, for example, 4×6 snapshots and allows all other sizes to be trimmed by hand. In such a device the cutter 26 would be either disableable or there would be a path around it for sizes larger than the high volume size.

FIG. 1 illustrates the utilization of the invention that is most remarkable. That is, the use of a single size large receiving sheet which is later cut to the desired size enormously improves the performance of the method and apparatus illustrated in FIG. 1.

Figure 32:
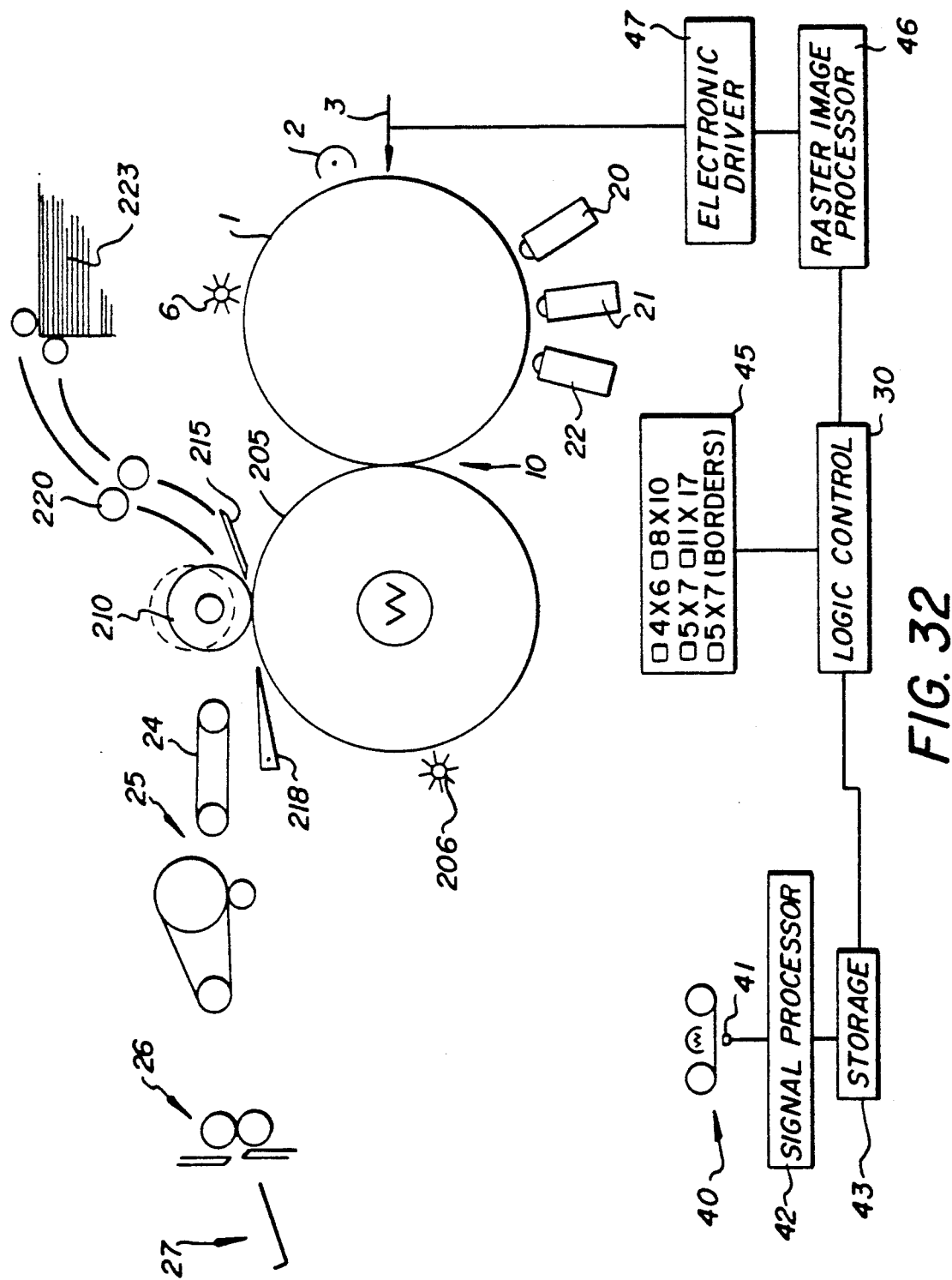
FIG. 32 is a side schematic illustrating use of the invention in a color electrophotographic method and apparatus different from that shown in the other embodiments.

However, other processes also will benefit by this approach, although not as spectacularly as the FIG. 1 apparatus. For example, FIG. 32 illustrates a multicolor electrophotographic imaging method comparable to that shown in FIG. 8 of U.S. Pat. No. 4,712,906, cited above. According to FIG. 32, the series of color toner images are formed on drum 1 as in FIG. 1. However, those images are accumulated on the surface of an intermediate transfer drum 205, which transfer drum does not hold a receiving sheet. A multicolor image is thus formed on the surface of intermediate transfer drum 205. That multicolor image is transferred in a single step to a large sized receiving sheet fed from a receiving sheet supply 223 through a pair of feed rollers 220 to a transfer station including a transfer back-up roller 210. The receiving sheet is separated from intermediate drum 205 by separating claw 218 and transported by a transport 24 to a fuser 25 as in the FIG. 1 apparatus. The receiving sheet is then cut by cutter 26 and deposited in output hopper 27, also as in the FIG. 1 apparatus. As in the FIG. 1 apparatus, the large images are formed on photoconductive drum 1 as an array of smaller images and the receiving sheets from supply 223 are substantially equal in size to the large images originally formed on drum 1. Although this structure does not have the remarkable advantages of the FIG. 1 structure associated with securing the transfer sheet to the transfer drum, it does present some advantage over the prior art. The receiving sheet supply 223 need not be flexible as to the size of sheet it can hold. The distance between the supply 223 and the transport rollers 220 as well as the distance between the transfer station and the fuser 25 need only be capable of handling the single-size sheet. Further, the larger-size sheet is somewhat easier to handle than, for example, 4×6 inch sheets.

The same advantages of the FIG. 32 apparatus for color imaging, i.e., advantages associated with ease in receiving sheet handling, would also be true for a single color apparatus. For example, even an ordinary, black only, electrophotographic copier would find some simplification in its apparatus if it handled only a single-size receiving sheet. The commercial attractiveness of such an embodiment would depend, of course, upon the expense of the cutting operation compared to the simplification of the sheet handling path.

Transfer in the FIG. 32 embodiment can be accomplished by heat. As shown in FIG. 32, both intermediate transfer drum 205 and back-up roller 210 are internally heated. The receiving sheet from supply 223 is preheated as it approaches the nip between transfer back-up roller 210 and intermediate drum 205 by preheating device 215. As shown in phantom in FIG. 32, back-up roller 210 is articulatable so that it is not in contact with intermediate drum 205 while the first two toner images are being transferred to drum 205. Drum 205 is cleaned by an articulatable cleaner 206.

The process illustrated in FIG. 1 can be capable of extremely high-quality imaging. The quality of that imaging is dependent on many portions of the process. In particular, it is dependent on the resolution of the exposure device 3, the size of the toners used to create the toner images and the registration associated with the exposure and transfer stations. To compete with ordinary photography in making prints, extremely fine toners are necessary. It is presently possible to tone images with toners as small as 3.5 microns and smaller which toners provide extremely high-quality images if correctly registered.

Transfer of extremely fine toners is difficult to do electrostatically. Better results are obtained by a combination of heat and pressure. If substantial pressures are used in the transfer process, for example, pressures in excess of forty pounds per square inch, and both the transfer roller and the image drum are independently driven, excessive wear will result to the surfaces in contact, which wear is especially damaging to the photoconductive surface of the imaging drum. U.S. patent application Ser. No. 07/488,546 to Jamzadeh et al, MULTICOLOR IMAGE FORMING APPARATUS, filed Mar. 5, 1990, deals with problems associated with maintaining registration in a system in which the transfer roller is driven by an imaging member such as photoconductive drum 1. According to that application, to maintain extremely precise registration for full utilization of extremely fine toner particles and high quality exposure, the transfer roller is separated from the image member and reindexed for every revolution of the transfer roller. This particular approach provides extremely precise registration of the transfer roller 5 and is illustrated in FIGS. 6-10.

Figure 6:
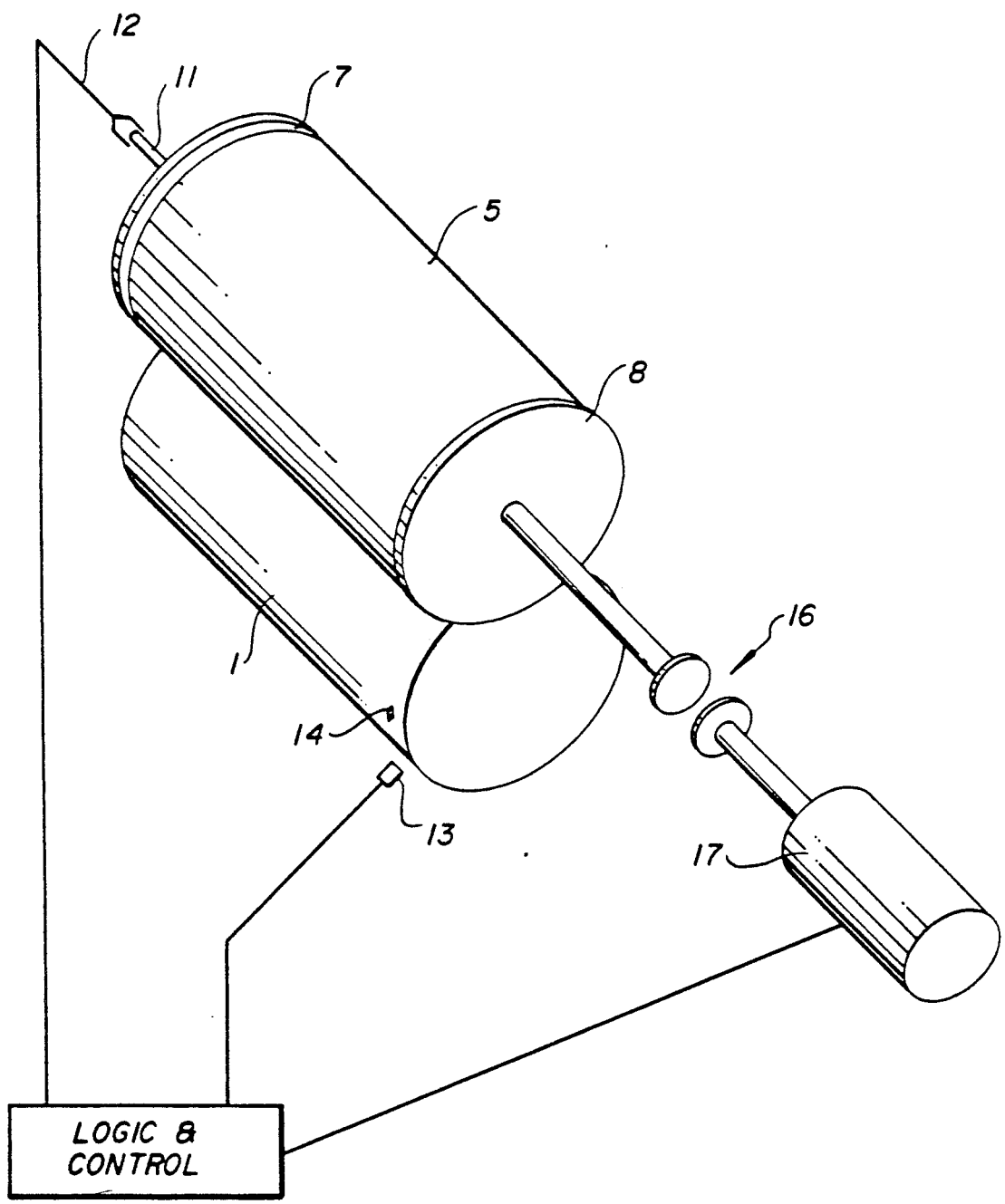
FIG. 6 is a perspective view of an embodiment of a portion of the apparatus shown in FIG. 1, with many parts eliminated for clarity of illustration.

According to FIG. 6 transfer roller 5 has a pair of cam disks 7 and 8 of the same diameter as roller 5 but centered about a different axis. They are fixed to roller 5 and are rotated with roller 5. Roller 5 is rotated by engagement with image member 1 during transfer. When transfer is finished, cam disks 7 and 8 acting either directly on drum 1 or on separate disks (not shown) journaled on the same shaft as drum 1, separate roller 5 from engagement with drum 1. After such separation, roller 5 is driven by a stepper motor 17 through a clutch 16. Roller 5 is driven by motor 17 to a home position controlled by an indicia 11 associated with roller 5 and sensed by a sensor 12. From the home position, motor 17 drives roller 5 up to its appropriate speed and rotational position for reengagement as controlled by disks 7 and 8.

Figure 7:
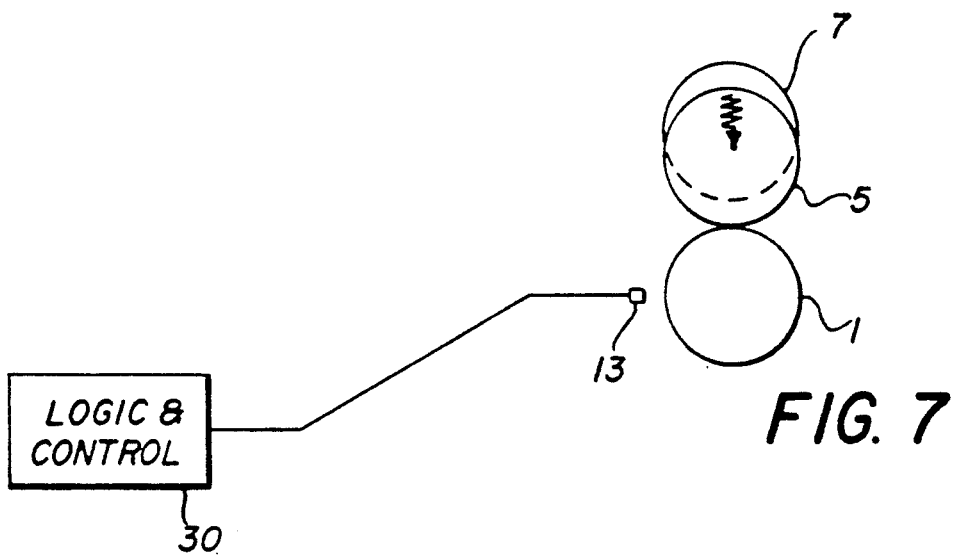
FIGS. 7, 8 and 9 are side schematics of the apparatus portion shown in FIG. 6 illustrating the relative movement of a transfer roller with respect to an imaging drum.
Figure 8:
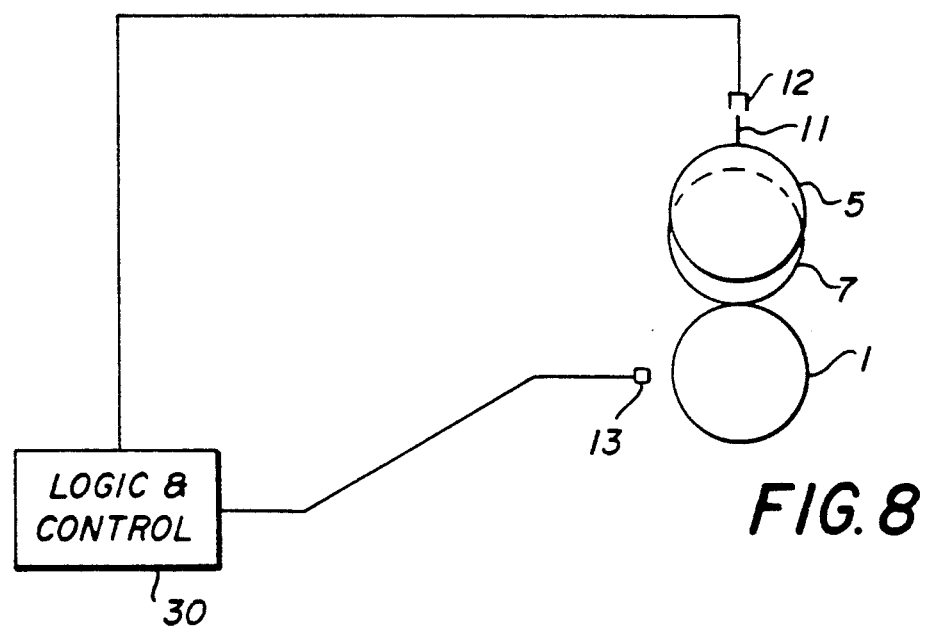
Figure 9:
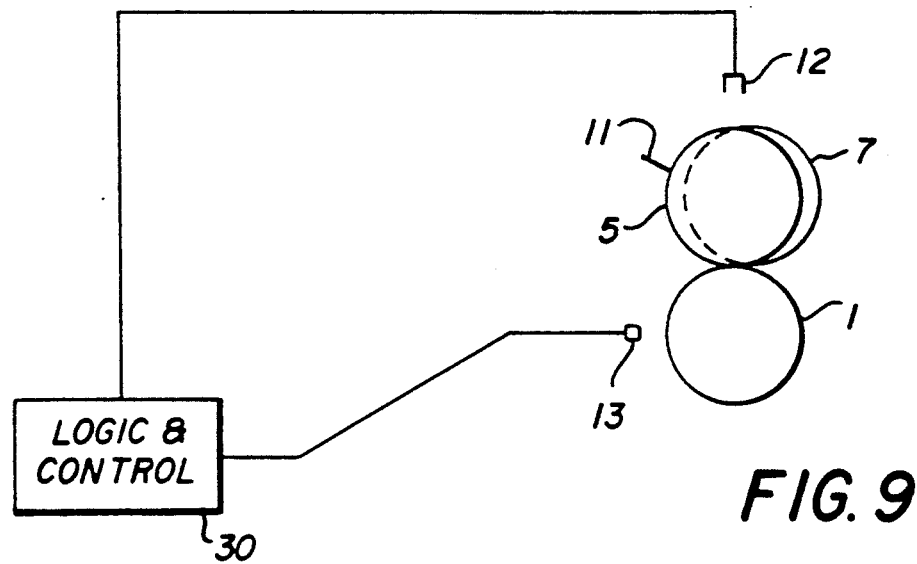

This process is illustrated in FIGS. 7-9. According to FIG. 7, roller 5 is in contact with drum 1 during image transfer. As shown in FIG. 8, after transfer, disk 7 separates transfer roller 5 from drum 1 and stepper motor 17 (FIG. 6) drives roller 5 until indicia 11 is sensed by sensor 12, at which point stepper motor 17 stops. The rotational position of drum 1 is also sensed, for example, by sensing an indicia 14 with a sensor 13 on the periphery of drum 1. Logic and control 30 receives signals from both sensors 12 and 13. In timed relation to receiving the signal from sensor 13 motor 17 is started again and driven until engagement of roller 5 with drum 1 is completed. Motor 17 is a high-quality stepper motor which is capable both of accurately positioning roller 5 at its home position and accurately driving it from that home position so that it is going at the same speed as drum 1 during engagement, which engagement is shown in FIG. 9. After engagement clutch 16 is disengaged and roller 5 is again driven by drum 1.

With the quality of stepper motor and sensors presently available, registration of a higher quality can be maintained between images than if the drum 1 is allowed to rotate the roller 5 through the entire cycle.

Figure 10:
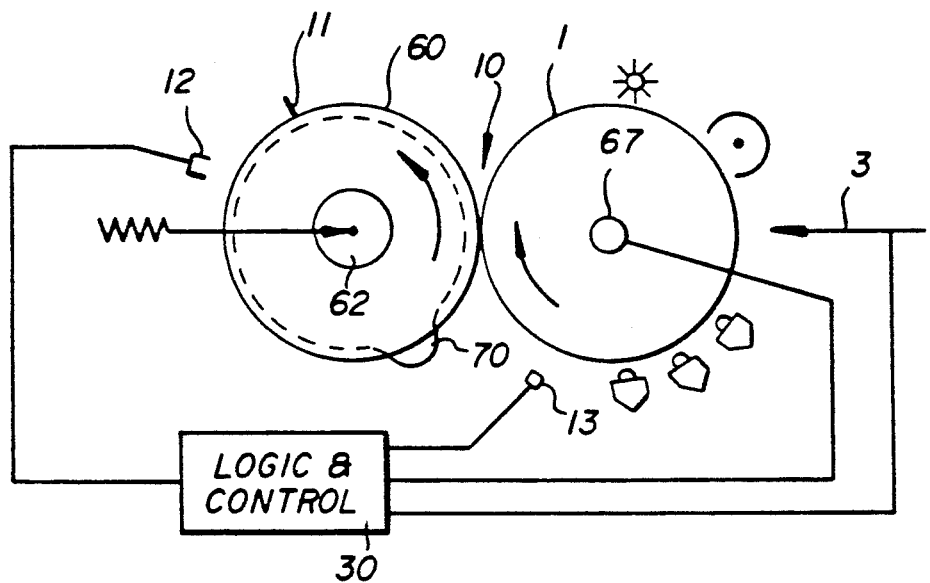
FIG. 10 is a side schematic of a portion of an embodiment of the apparatus shown in FIG. 1 illustrating another mechanism for moving the transfer roller with respect to the imaging drum.

FIG. 10 illustrates this approach in an apparatus similar to that of FIG. 1. Note that a transfer roller 60 is driven by engagement with drum 1 except when a cam 70 rotating with roller 60 contacts drum 1 and disengages roller 60 therefrom.

Figure 11:
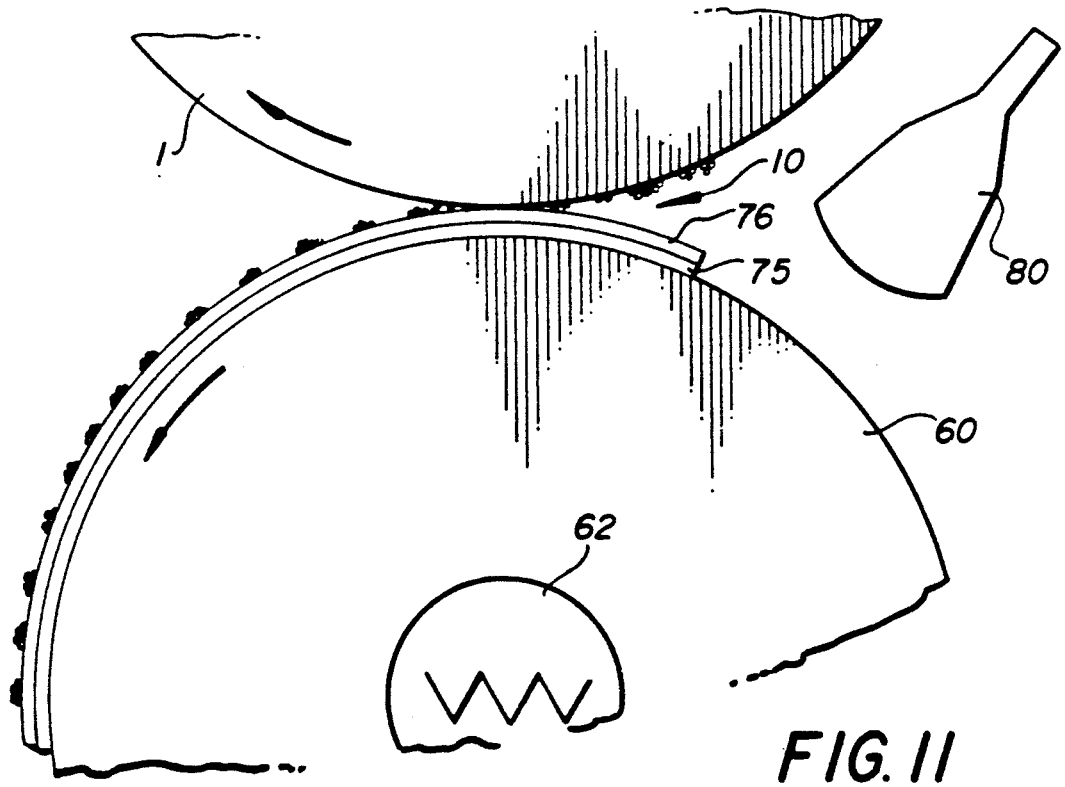
FIG. 11 is a partial cross-section of the transfer roller and imaging drum shown in FIG. 10 illustrating a preferred form of transfer.

FIG. 11 illustrates the type of transfer with which the structure shown in FIGS. 6-10 is particularly usable. According to FIG. 11, extremely small toner particles making up a toner image are transferred from drum 1 to a receiving sheet 75, which receiving sheet includes a thermoplastic outer layer 76. Layer 76 is heat softenable as is the toner. According to a process more thoroughly described in U.S. Pat. No. 4,968,578, Rimai et al, METHOD OF NON-ELECTROSTATICALLY TRANSFERRING TONER, issued Nov. 6, 1990, the receiving sheet 75 and particularly outer layer 76 is raised to a temperature which softens the thermoplastic layer 76. This is accomplished by heating roller 60 internally, using heating lamp 62 and also may be accomplished by externally heating thermoplastic layer 76, for example, by externally located lamp 80. The heat of the receiving sheet 75 also heats the toner in the nip 10. The edges of the toner sinter or become soft. The layer of toner which first contacts the softened thermoplastic layer 76 becomes embedded in it and the rest of the toner which has also become soft or sintered sticks to the toner that is so embedded. Transfer is thus effected to the thermoplastic layer 76 as shown in FIG. 11. This process works best at relatively high pressures, for example, pressures well in excess of 100 pounds per square inch. Lower pressures are also effective, especially working with larger sized toners with more modest quality images on regular uncoated paper. Good thermal transfer from the interior of the roller 60 while maintaining relatively high pressures is best obtained if both drum 1 and roller 60 are hard rollers and do not contain a nip widening compliant surface. Again, for less high-quality work, especially with plain paper, roller 60 can have a slightly compliant surface as is more customary in the art.

It is common in many color copiers using a drum photoconductor to provide a substantial fly wheel driven with the drum to even out the rotation of the drum to avoid image defects. Defects that are repeated in all colors in the same way are less objectionable than a defect that occurs only in one color and not in others. The latter defect may show up as a shift in color and be quite noticeable. For that reason, it is common to have both the drum and transfer roller of the same size and form one image for each revolution of each. Thus, any variations in the periphery of the drum or transfer roller or variations that occur repeatedly in the motion of either will be repeated with each image and not show as a misregistration of colors.

As mentioned above, precision in the exposure station is one of the ingredients which provides extremely high quality results that makes an electrophotographic application competitive with regular photography. Referring to either FIGS. 1 or 10 it is noted that the transfer station and the exposure station are approximately 180° apart from each other. At the same time that the electronic exposure station 3 is writing an image, the transfer station is going through its cycle. The transfer station itself involves discontinuities in the mechanical interface between drum 1 and roller 60. For example, the registration arrangement illustrated in FIGS. 6–10 include an engagement step between the roller 60 and the drum 1 and a disengagement step. In between engagement and disengagement the drive for drum 1 drives both drum 1 and roller 60. While the two members are disengaged the drive for drum 1 need drive only drum 1. These discontinuities in the engagement between drum 1 and roller 60 can cause a variation in the motion of drum 1 which will affect the quality of exposure provided by electronic exposure station 3. In systems in which the drum 1 and roller 60 are not disengaged, the edges of the receiving sheet also provide a discontinuity, not nearly as large as that illustrated in FIGS. 6–9 but still capable of affecting imaging. This later variation of the problem will be discussed with reference to FIGS. 28–31.

Figure 12:
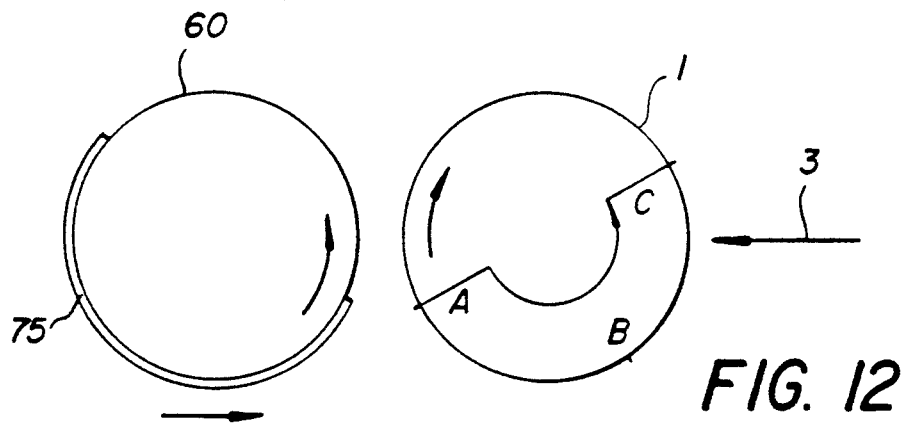
FIGS. 12, 13, 14 and 15 are side schematics of the transfer roller and imaging drum illustrating one approach to coordination of those members.

The affect of such discontinuities can be totally eliminated by not writing with exposure station 3 during the discontinuities. Such an arrangement is illustrated in FIGS. 12–15 in a system in which one image is created for each revolution of image member 1. According to FIG. 12, one-half or less of the circumference of drum 1 is written on as drum 1 passes exposure station 3. An image is written through an arc ABC as shown in FIG. 12 as drum 1 rotates in a clockwise direction past exposure station 3. The arrow inside the drum 1 illustrates the progressive direction of scan as seen by the drum 1, which is in the opposite direction to the rotation of drum 1 past exposure station 3.

Figure 13:
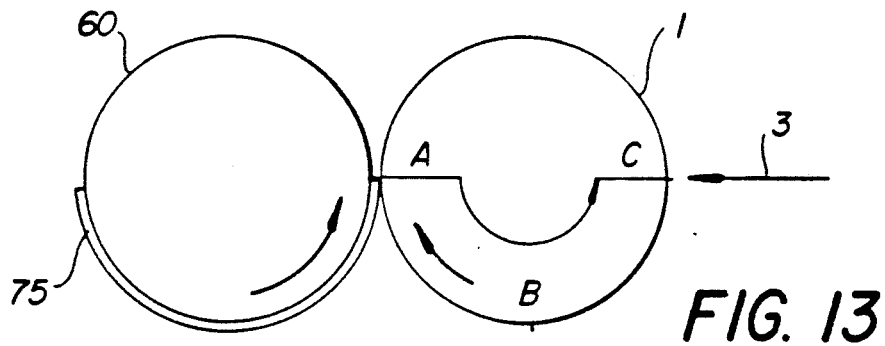
Figure 14:
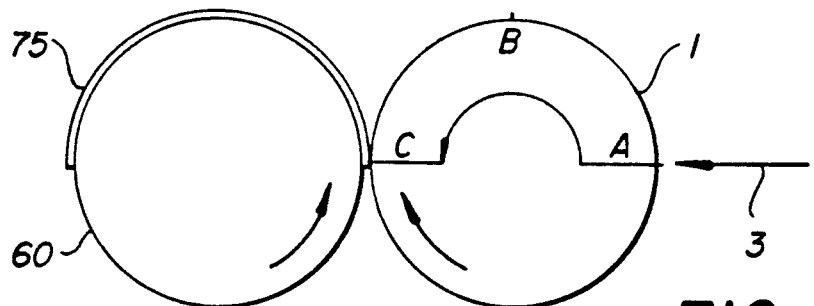
Figure 15:
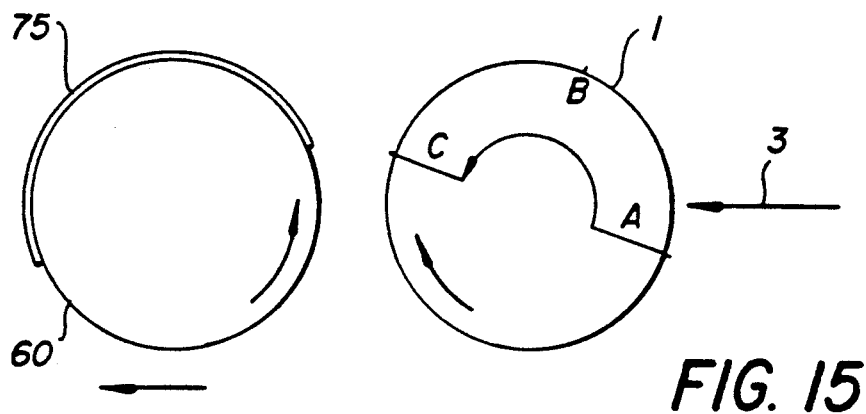

According to FIG. 13, roller 60 and drum 1 are engaged at the edge of transfer sheet 75. At substantially the same instant of engagement, the exposure station 3 is turned off having finished its scan. According to FIG. 14, transfer takes place through half a revolution of the drum 1 and roller 60. As transfer finishes with point C on drum 1 reaching the trailing edge of the receiving sheet 75, laser 3 begins its scan at point A and roller 60 is separated from drum 1 as shown in FIG. 15.

From the process described in FIGS. 12–15, it can be seen that both discontinuities at engagement and disengagement can be outside the scanning time of exposure station 3 if slightly less than one-half of drum 1 is used for that exposure. In fact, with the preciseness available with this system, very close to one-half of drum 1 can be used for such exposure. This system thus has a duty cycle of approximately 50%.

Figure 16:
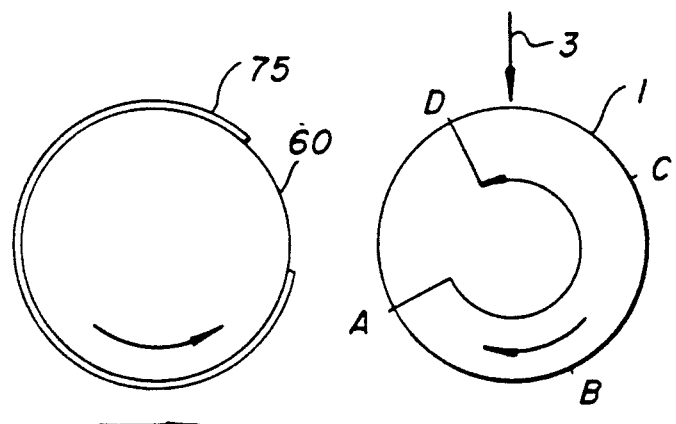
FIGS. 16-19 are side schematics similar to FIGS. 12-15 illustrating an alternative approach to coordination of those members.
Figure 17:
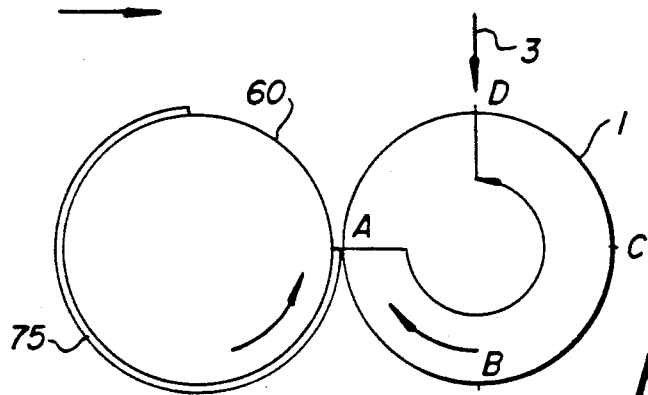
Figure 18:
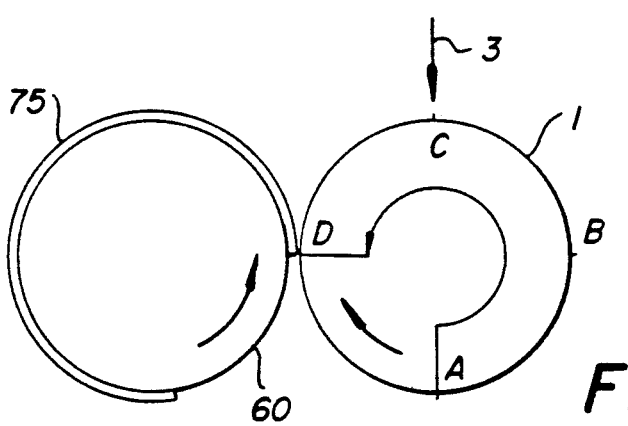
Figure 19:
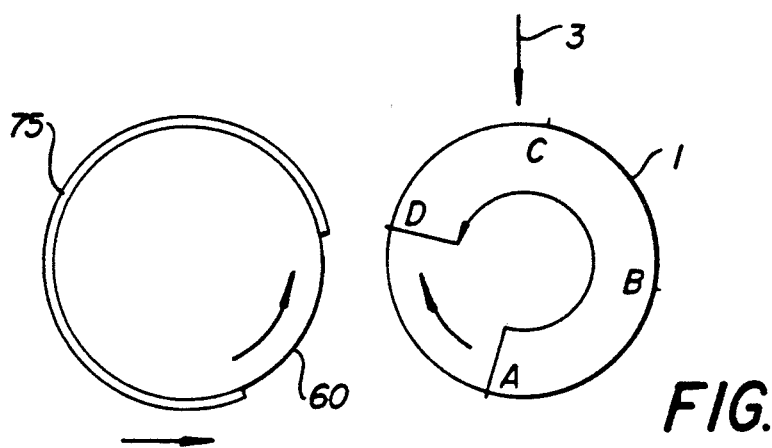
Figure 20:
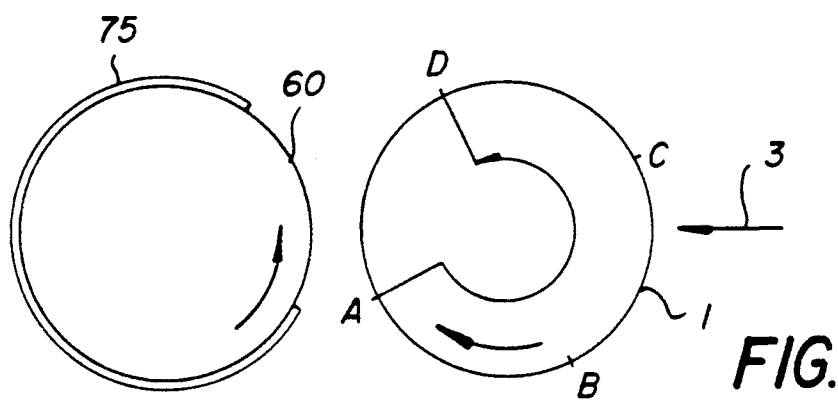
FIGS. 20-23 are side schematics similar to FIGS. 12-15 illustrating another approach to coordination of those members.
Figure 21:
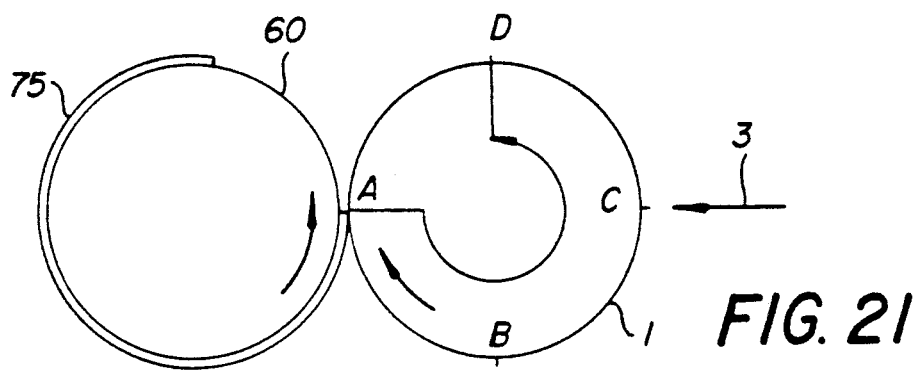
Figure 22:
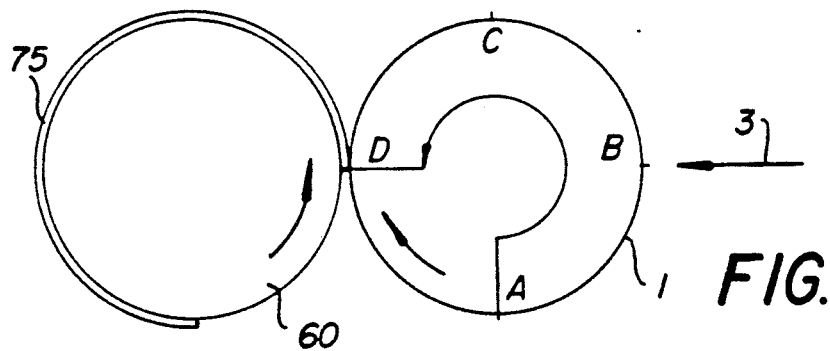
Figure 23:
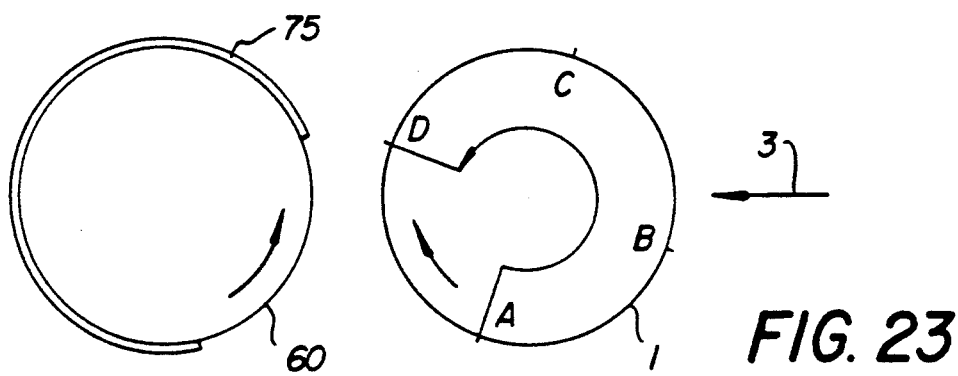
Figure 24:
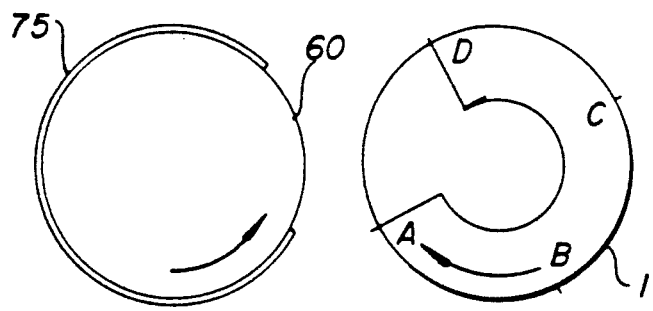
FIGS. 24-27 are side schematics similar to FIGS. 12-15 illustrating still another approach to coordination of the transfer roller and imaging drum.
Figure 25:
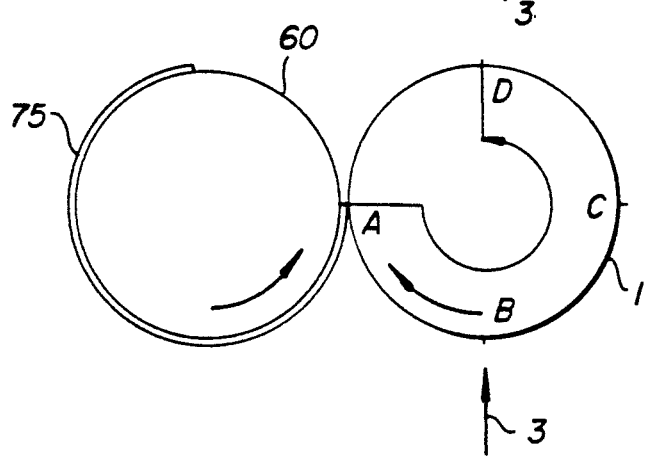
Figure 26:
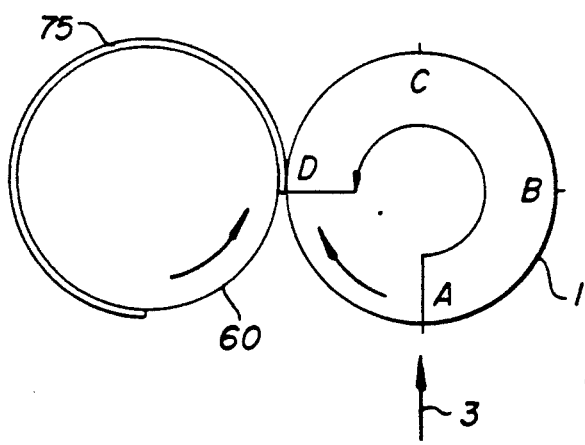
Figure 27:
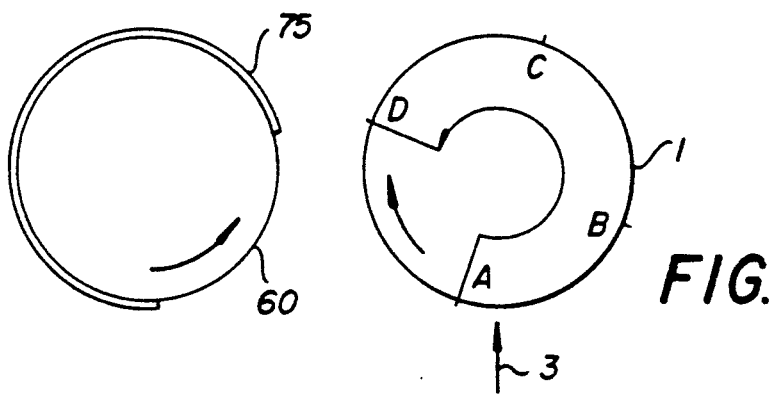

FIGS. 16–27 illustrate three approaches to increasing that duty cycle utilizing the imaging scheme described with regard to FIGS. 1–5. According to FIGS. 16–19, exposure station 3 is 90° from the transfer nip and three-fourths of the circumference of drum 1 is utilized in creating a large image made up of nine smaller images as diagrammed in FIG. 2. Laser exposure station 3 exposes the large image over an arc ABCD. The cross-track interfaces between small images occur at points B and C. This is true whether the long dimension or the short dimension is in the cross-track dimension because both dimensions are divided in thirds according to the FIG. 2 scheme. As shown in FIG. 16, roller 16 is being brought toward engagement with drum 1 as the scan of exposure station 3 approaches its end at point D. As shown in FIG. 17, engagement between roller 60 and drum 1 at point A occurs just as the point D is reached in the scan and the exposure station is turned off. According to FIG. 18 disengagement occurs as point D reaches the point of contact with roller 60. This occurs as point C is being scanned by exposure station 3. Point C is the boundary between the second and third sets of small images shown in FIG. 2. Any fluctuation in the motion of drum 1 would show up as an image artifact at or close to that boundary. Considering the preciseness of the system in general, it is likely that the artifact will occur at a place eliminated in the cutting operation. However, even if it is slightly displaced from that position, it occurs at the least objectionable portion of the image, that is, next to that boundary.

The condition shown in FIG. 17 of engagement involves both the impact of roller 60 moving into drum 1 and also the increased load of driving roller 60 by the drive system for drum 1 and is therefore the greater discontinuity. This system locates that defect essentially outside of any of the image areas with impact occurring as the laser quits writing. The effect of the separation of roller 60 which occurs at the position shown in FIG. 18 primarily is affected only by the immediate decrease in load on the drive system for drum 1. This discontinuity has less effect on image writing than does the condition in FIG. 17 of engagement. Its positioning with the writer at the point C is a preferred approach to reducing discontinuities in the writing overall.

The FIGS. 16–19 location of the exposure station 3 forces both the cleaning station and the charging station into the quadrant between the transfer nip and that exposure station. Some machine configurations may not lend themselves to locating those two stations in such a limited space. FIGS. 20–23 show an alternative approach, similar to FIGS. 16–19, but which allows more space for the cleaning and charging stations. According to FIGS. 20–23, the exposure station is located directly opposite the transfer station as in FIGS. 12–15. However, the impact of engagement shown in FIG. 21 occurs when the exposure station 3 is at point C, the boundary between the second and third sets of small images shown in FIG. 2. Disengagement, shown in FIG. 22, then occurs at point B which is the boundary between the first and second set of small images in FIG. 2. In this embodiment, both discontinuities occur within the large image but at a boundary between the small images. Although this is not as desirable from an image defect standpoint as the embodiment shown in FIGS. 16–19, it is superior in terms of machine geometry.

FIGS. 24–27 show a third location for the exposure station 3. With this approach, engagement shown in FIG. 25 occurs when point B is being written while disengagement occurs as point A is being written. This approach, while acceptable, is inferior to the other two embodiments in that the larger discontinuity of engagement (FIG. 25) occurs while writing at one of the boundaries between small images rather than outside or nearly outside of the entire large image area. At the same time, from a machine geometry standpoint all of the toning stations must be crowded between the exposure station and the transfer nip. For some toning stations, this would be impossible. However, if toning stations are cycled into and out of position as in some color apparatus, the FIG. 24 through 27 embodiment could be used.

Larger-size prints, for example, those made with the image arrangements shown in FIGS. 3-5 will generally end up with the image defect in the images. The larger the overall image, the less serious is a given size of defect. Thus, for the larger sizes the defect may be acceptable. However, if it is not acceptable in very high quality work, the larger images can be done at lower productivity than snapshots, skipping every other frame to avoid the defect entirely. Note that the FIG. 4 arrangement of 5×7's could be used without the two images on the left side and the discontinuities would occur while the lasers were writing in the borders between the other three images.

FIGS. 28-31 show another variation of the apparatus shown in FIGS. 6-10. The cam disks 7 and 8 in FIGS. 6-9 and the cam 70 are replaced by a pair of disks 161 and 162 shown in FIGS. 28 and 29. According to FIG. 28, internally heated transfer roller 60 is driven by engagement with drum 1 during transfer as in FIG. 10. A stepper motor 117 drives roller 60 through shaft 125 when between transfers.

Figure 29:
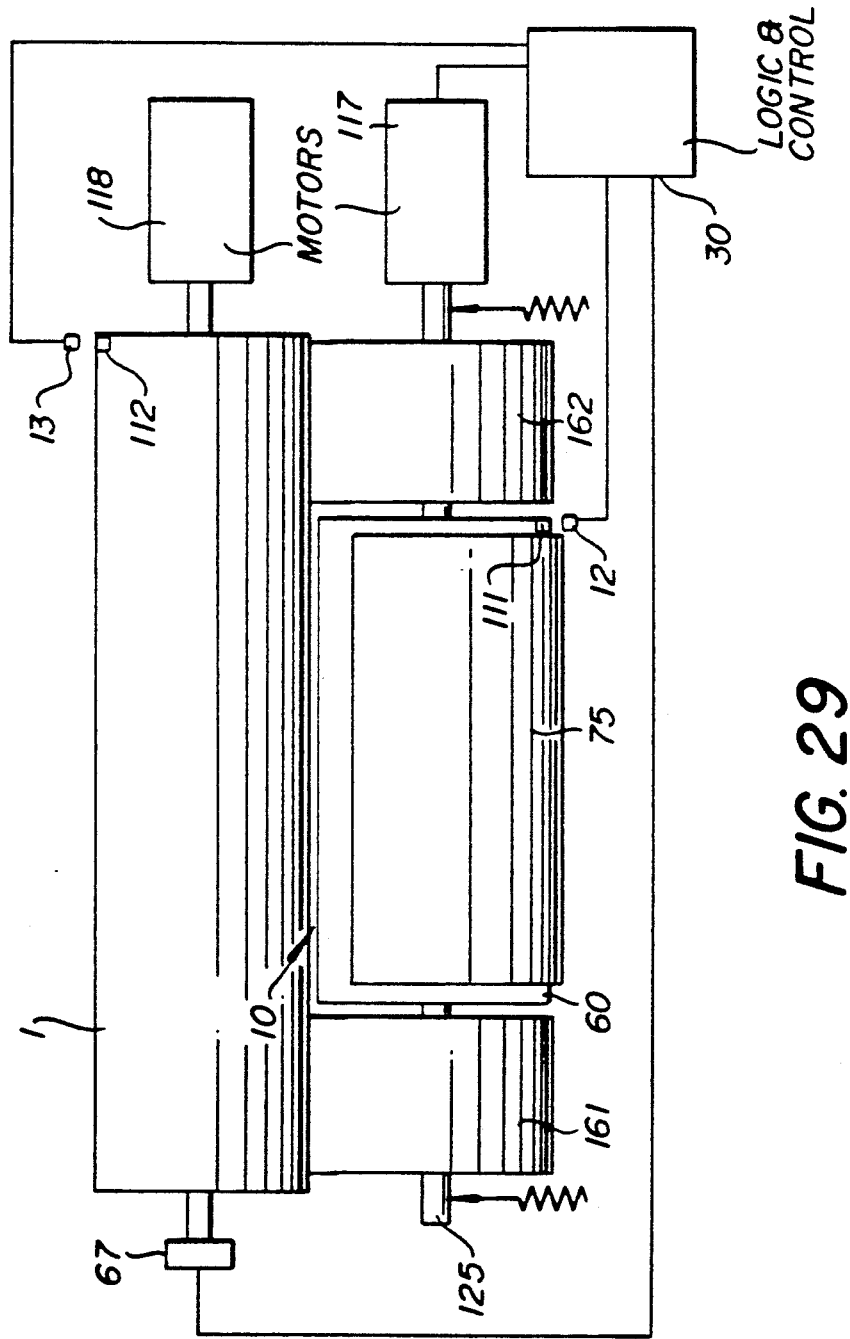

Disks 161 and 162 have a radius slightly less than the combined radius of heated transfer roller 60 and receiving sheet 75 when sheet 75 is compacted by drum 1 and heated roller 60 in the nip 10. Shaft 125 is spring loaded as shown to obtain the desired pressure for transfer. As shown in FIG. 29, at the end of transfer, as the receiving sheet 75 leaves the nip, the loaded shaft 125 moves toward drum 1 until disks 161 and 162 contact the surface of drum 1 outside the image area.

Disks 161 and 162 are mounted on shaft 125 and are free to rotate with respect to it. As shown in FIG. 29, roller 60 is now separated from drum 1 and can be rotated by motor 117 through shaft 125, essentially as described with respect to FIG. 6. That is, stepper motor 117 rotates roller 60 until it reaches a home position as controlled by sensor 12 sensing a mark 111 on the periphery of roller 60. Roller 60 is then rotated from its home position in timed relation to rotation of drum 1. This can be controlled by sensor 13 which senses a mark 112 on drum 1 or by encoder 67, or both. Drum 1 is driven by a motor 118 and may also include a flywheel (not shown) to steady its movement.

Figure 28:
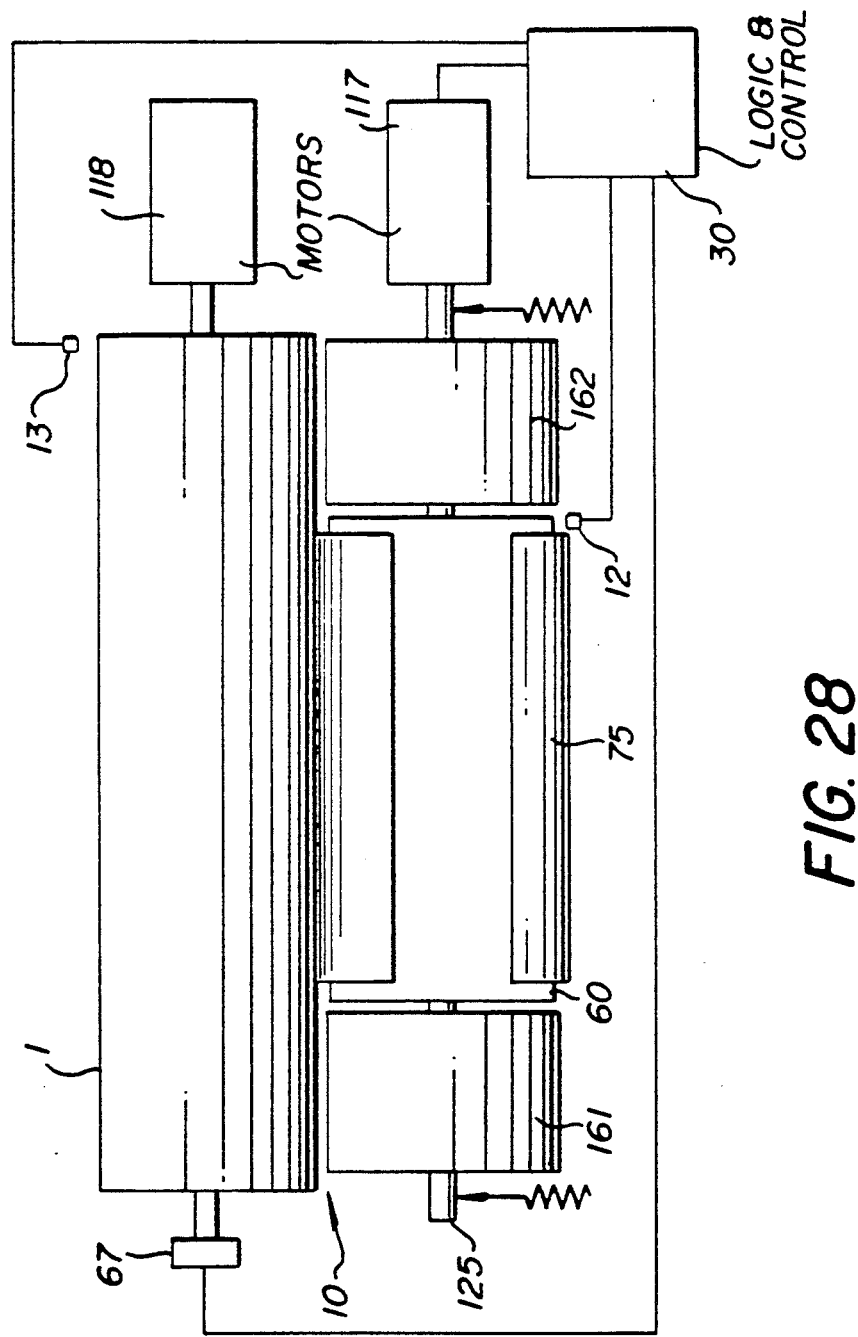
FIGS. 28 and 29 are top views of two different instances in the revolution of an alternative transfer roller drum embodiment to that shown in FIGS. 6-10.

The thickness of receiving sheet 75 and the separation between drum 1 and disks 161 and 162 have been exaggerated in FIGS. 28 and 29 to aid the explanation. Disks 161 and 162 can be made less than 0.002 inches in radius less than the radius of the compacted receiving sheet and roller. Thus, the movement from the edge of the receiving sheet to the disks is very slight. Nonetheless, even that small an impact can result in a discontinuity of visible proportions at the exposure station.

Figure 30:
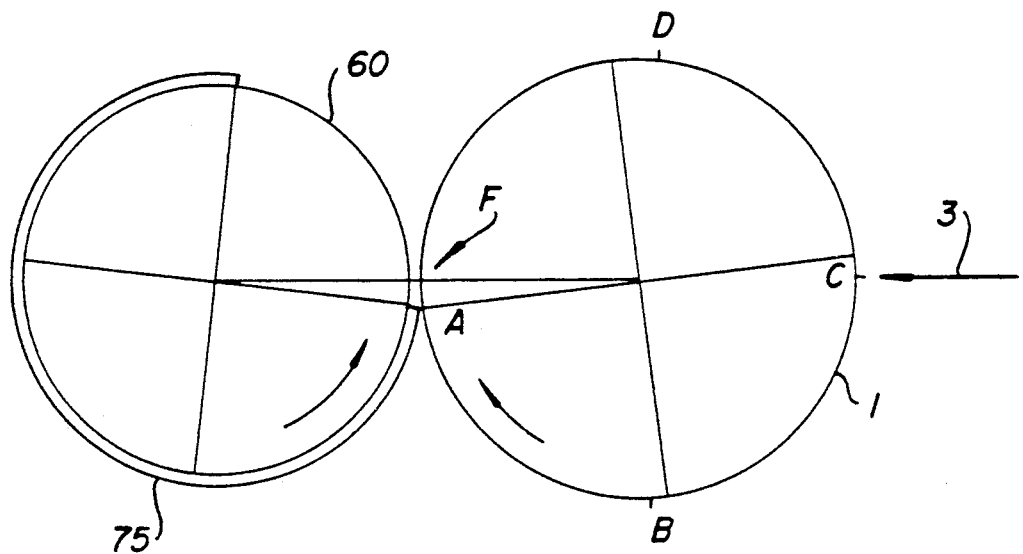
FIGS. 30 and 31 are side schematics similar to FIGS. 13-14 illustrating coordination of the transfer roller and imaging drum shown in FIGS. 28 and 29.
Figure 31:
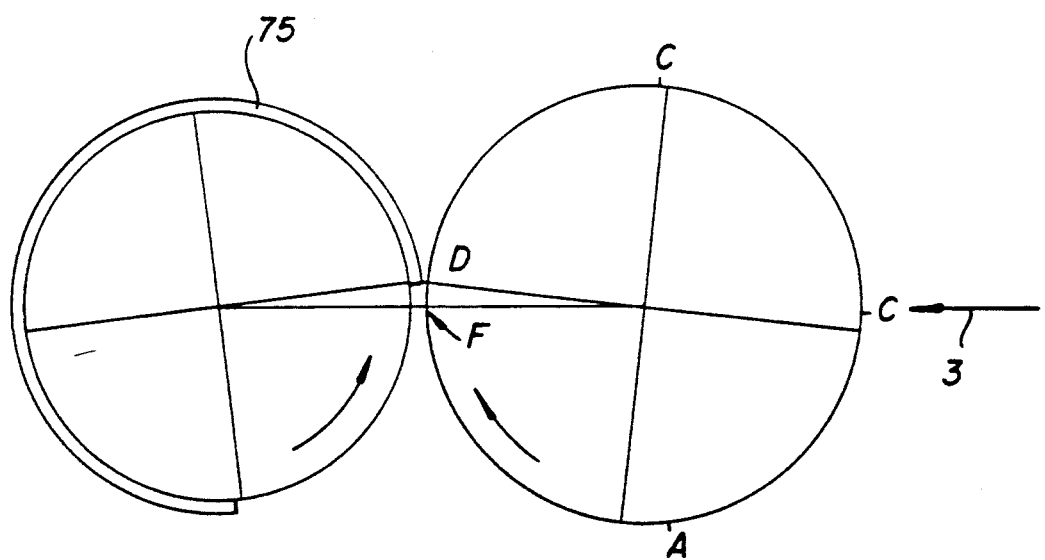

The discontinuities in such a system do not occur exactly as shown in FIGS. 12-27, i.e., at the center of the nip. The thickness of the receiving sheet 75 will cause engagement slightly upstream of the nip center and will cause disengagement slightly downstream of the nip center. In systems like that shown in FIGS. 28 and 29 in which the transfer roller 60 is reindexed for each image, this variation can be compensated for by making drum 1 slightly larger in diameter than the combined diameter of roller 60 at its operating temperature and receiving sheet 75. This refinement is shown in FIGS. 30 and 31. According to FIGS. 30 and 31, the circumference of drum 1 is made larger by an amount that will compensate for the width of the nip, i.e., the distance between the points of engagement and disengagement. In the FIGS. 30-31 example, the circumference of drum 1 should equal the circumferential distance between the points of discontinuity (the distance between the point A in FIG. 30 at engagement and point D in FIG. 31 at disengagement) plus 4/3rds of the length (in the in-track direction) of the receiving sheet 75. Since the roller and drum are reindexed for each image the circumference of the roller 60 is immaterial, needing to be only big enough to accept sheet 75.

With this arrangement, exposure station 3 is 180° from the center of the nip, point F, and the discontinuities felt by drum 1 occur when point C (FIG. 30) and point B (FIG. 31) are being written. Since they occur on the boundary between images (FIG. 2) they do not affect image quality. The overall arrangement, FIGS. 28-31, provides the high quality registration of FIGS. 6-10 but with a simpler mechanism.

The invention has been described in detail with particular reference to a preferred embodiment thereof, but it will be understood that variations and modifications can be effected within the spirit and scope of the invention as described hereinabove and as defined in the appended claims.

We claim:

1. A method of producing a plurality of reproductions from one or more originals, said method comprising:

forming an electrostatic image having a first size on an image member, applying toner to said electrostatic image to form a toner image, and transferring said toner image to an intermediate transfer member and then transferring said toner image from said intermediate transfer member to a discrete receiving sheet having a leading edge and a trailing edge, characterized in that said forming step includes forming said large size electrostatic image as an array of smaller images being formed from one of said originals, and said method further includes the step of cutting said receiving sheet according to the position of toner images transferred thereto corresponding to said smaller electrostatic images.

2. The method according to claim 1 wherein said originals are each an electronic signal representing an image which signal is stored in a memory, and said forming step includes accessing said memory and electrically exposing a uniformly charged photoconductive image member according to said signals.

3. A method of producing a plurality of multicolor prints from one or more originals, said method comprising:

forming a series of electrostatic images of a first size on an image member, applying toner of different colors to each of said electrostatic images to form a series of different color toner images, and transferring said toner images in registration to a receiving surface to form a multicolor toner image on said surface, and utilizing said multicolor toner image, characterized in that said forming step includes forming said large-size electrostatic images in an array of smaller-sized electrostatic images, each of said smaller-sized images being formed from one of said originals, and said forming and utilizization steps include forming said multicolor image on a discrete receiving sheet having leading and trailing edges and cutting said receiving sheet according to the position of toner images thereon corresponding to said smaller electrostatic images.

4. A method according to claim 3 wherein said transferring step includes transferring said series of toner images to the surface of an intermediate transfer roller in registration to form said multicolor image on said surface, and transferring said multicolor image in a single step to said receiving sheet.

* * * * *